United States Patent

Nudo et al.

[11] Patent Number: 5,914,175
[45] Date of Patent: Jun. 22, 1999

[54] COMPOSITE PANEL AND METHOD

[75] Inventors: Thomas Nudo, Springfield, Ill.; James Fullwood, Tequesta, Fla.

[73] Assignee: Duraframe Window Shutter Systems Inc., West Palm Beach, Fla.

[21] Appl. No.: 08/917,127

[22] Filed: Aug. 25, 1997

[51] Int. Cl.$^6$ .................................. B32B 3/20; B32B 1/00
[52] U.S. Cl. ........................ 428/178; 428/72; 428/188; 156/60; 156/300; 52/793.1
[58] Field of Search ................................ 428/178, 188, 428/72, 137; 156/60, 300, 222, 293, 297; 52/793.1

[56] References Cited

U.S. PATENT DOCUMENTS

| | | |
|---|---|---|
| 4,384,436 | 5/1983 | Green . |
| 4,416,096 | 11/1983 | Schuster et al. . |
| 4,423,574 | 1/1984 | Pierre . |
| 4,454,691 | 6/1984 | Mitchell . |
| 4,707,393 | 11/1987 | Vetler ........................................ 428/178 |
| 4,928,450 | 5/1990 | Rutledge . |
| 5,204,161 | 4/1993 | Pettit et al. .............................. 428/178 |
| 5,462,623 | 10/1995 | Day . |
| 5,465,537 | 11/1995 | Fullwood . |
| 5,509,239 | 4/1996 | Fullwood . |
| 5,522,190 | 6/1996 | Fullwood . |
| 5,524,403 | 6/1996 | Fullwood . |
| 5,527,588 | 6/1996 | Camarda et al. ........................ 428/188 |
| 5,533,308 | 7/1996 | Fullwood . |

FOREIGN PATENT DOCUMENTS 2276652  10/1994  United Kingdom .

*Primary Examiner*—Donald Loney
*Attorney, Agent, or Firm*—Rosenberg, Klein & Bilker

[57] ABSTRACT

This invention provides for a composite panel (10) which may be mounted to a base surface (12) of a building structure (16) to allow for absorbing impact or other force loading considerations. The composite panel (10) includes a first core (20) which is made up of a number of first cell members (22) which are located next to each other and form through passageways (32) extending in a longitudinal direction (24). Mounted in adhesive contact with the first core (20) is a second core (26) formed of a number of second cell members (28) which are located next to each other and provide for second core through passageways (44) which extend in a transverse direction to produce a cross-pattern with respect to the first and second through passageways (32 and 44). The first core (20) and the second core (26) are adhesively mounted to each other to provide an overall laminated composite panel structure which blocks access to the window or door areas (14) of the building structure (16).

18 Claims, 3 Drawing Sheets

COMPOSITE PANEL AND METHOD

BACKGROUND OF THE INVENTION

1. Field of the Invention

The subject invention relates to a composite panel structure mounted to a base surface for absorbing impact loading. In particular, the present invention directs itself to a composite panel formed of laminated members which is adapted for placement over apertures exposed to harsh environmental conditions. Still further, this invention relates to a composite panel which may be used for protection of glass windows, glass doors, or like elements on the exterior of a building structure for use in protecting such exposed areas to harsh external environmental conditions such as hurricanes, monsoons, or the like. Still further, this invention directs itself to a composite panel structure which is mounted directly to building surfaces during times when impact loading may occur and which may then be removed subsequent to such impact loading conditions being relieved. More in particular, this invention directs itself to a composite panel having a first core formed of a plurality of cell members which are contiguously mounted each to the other which define through passages extending in a first direction which is mounted in laminated fashion to a second core formed of a plurality of second cell members having second core through passages extending in a second direction which is perpendicular to the first direction. Further, this invention directs itself to a laminated composite panel structure having first and second cores which are secured to at least one skin sheet adhesively coupled to at least one of the sides of the combined first and second cores. Still further, the subject invention directs itself to a laminated composite panel which has first and second cores having cross-directed flutes or troughs with skin sheets fastened to opposing sides of the combined first and second cores. More in particular, the subject invention directs itself to composite panels which are relatively lightweight with increased impact loading strength conditions and have a thickness amenable to mounting on the exterior surfaces of buildings.

2. Prior Art

Laminated panels are known in the art. In general, such prior art panels include some type of core material with a skin coating. In many instances, the problems of such prior art panels is that the weight of the panels is of such a nature that mounting to exterior surfaces of buildings or the like is an extremely tedious procedure. Obviously, the thicker that such prior art panels are made, the more protection they provide for the exterior of such buildings, however, with increased weight and thickness of prior art panels, the cost of manufacture as well as the weight are increased. It is a purpose of the subject invention to provide a combination of elements making up a laminated composite panel which minimizes the thickness as well as the weight while maximizing the impact loading strength of the composite panel.

SUMMARY OF THE INVENTION

The present invention provides for a composite panel which is adapted to be mounted to a base surface for absorbing impact loading. The composite panel is formed of a first core having a plurality of first cell members contiguously located each to the other defining respective first core through passages which extend in a longitudinal direction. The composite panel further includes a second core formed of a plurality of second cell members contiguously mounted and located each to the other which define respective second core through passages extending in a transverse direction. The first and second cores are secured each to the other to provide a laminated composite panel structure.

It is a principal objective of the subject composite panel to provide a laminated panel structure which is adapted to be mounted to a base surface for absorbing impact loading and protecting the base surface from such force loading considerations.

It is a further objective of the subject composite panel to provide a structure which protects window and door areas of a building structure from the forces associated with harsh environmental conditions such as hurricanes, monsoons, or other like natural phenomena.

It is a further objective of the subject invention to provide composite panel structures which have a low weight for ease of mounting and maximize the force loading characteristics to protect underlying surfaces to which the composite panel is attached.

It is a further objective of the subject invention concept to provide composite panels which may be preformed to particular sizes associated with standard apertures on buildings to thereby eliminate any wasteful cutting or fitting of such composite panels.

It is a still further object of the subject invention to provide a pair of laminated core structures which are grooved in mutually orthogonal relation to provide a structure which maximizes impact loading strength of the overall composite panel.

DESCRIPTION OF THE PREFERRED EMBODIMENTS

Figure 1:
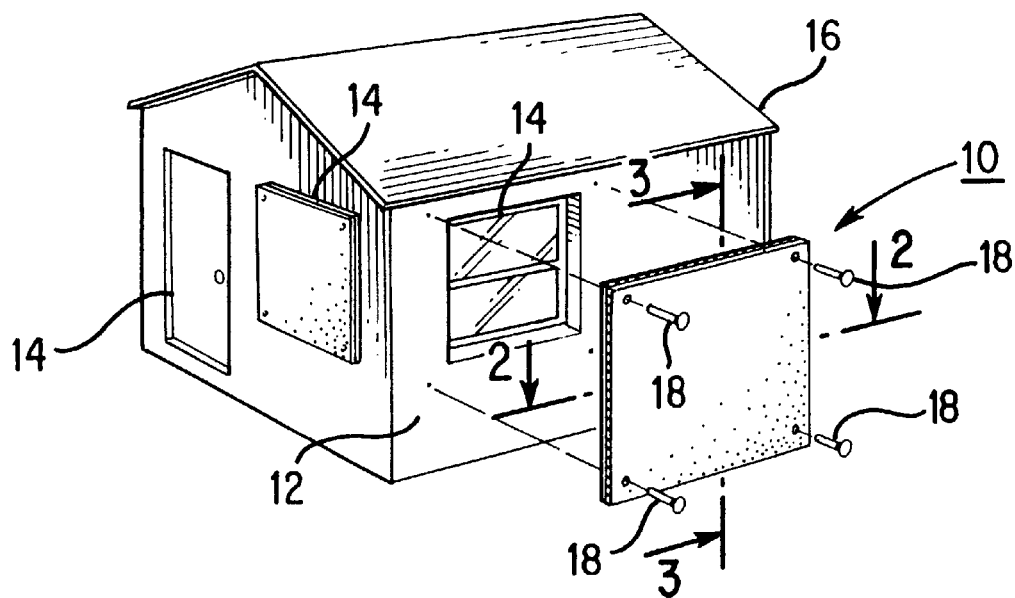
FIG. 1 is a perspective view of the subject composite panel shown in exploded perspective view and adapted for mounting to a building structure.

Referring now to FIGS. 1–4, there is shown composite panel 10 adapted for mounting to a base surface 12 used in general to protect an aperture, window area, glass door area 14, or the like. Composite panel 10 is generally although not restrictively associated with protection of vulnerable areas of buildings 16 when such buildings 16 encounter disadvantageous environmental conditions such as hurricanes, monsoons, or other environmental conditions which would have high winds associated therewith.

In particular, composite panel 10 is so constructed to provide protection and absorb impact loading which may occur due to high wind forces driving various members, elements, or debris against the sides of buildings 16 where glass filled apertures would be vulnerable to impact loading considerations.

Composite panel 10 may be mounted to base surfaces 12 through threaded securement such as composite panel bolts 18 or some like removable mechanism not important to the inventive concept as herein described, with the exception that the mechanism through which composite panel 10 is mounted to base surface 12 be sufficient to maintain securement of composite panel 10 to base surface 12 of building or other structure 16.

Figure 2:
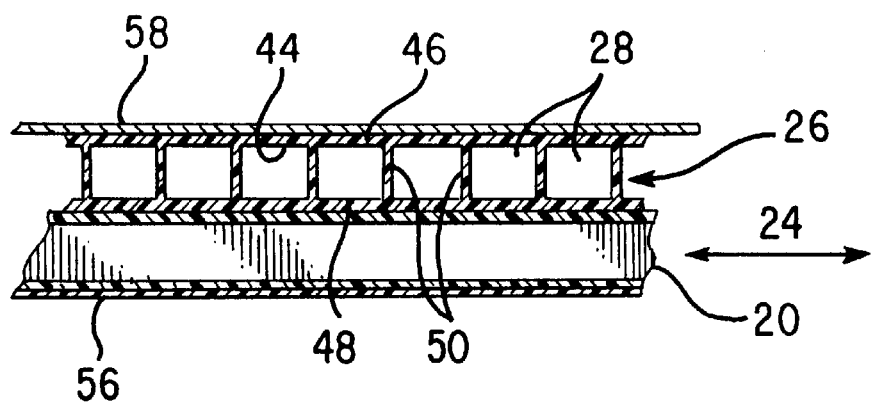
FIG. 2 is an enlarged cross-sectional view of the composite panel partially cut-away along the section lines 2—2 of FIG. 1.
Figure 3:
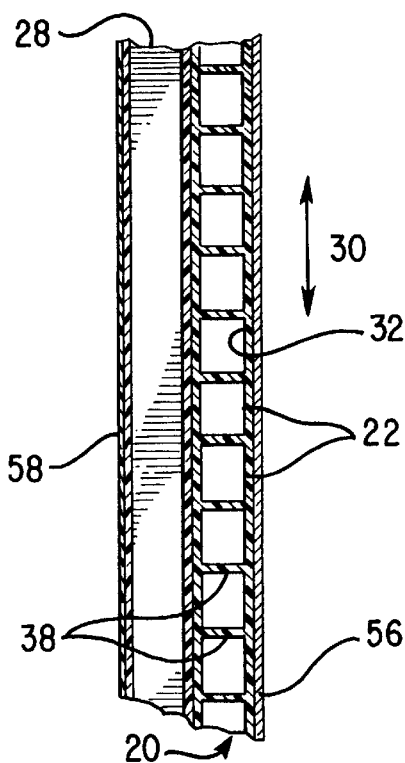
FIG. 3 is an enlarged cross-sectional view of the composite panel partially cut-away taken along the section lines 2—2 of FIG. 1.
Figure 4:
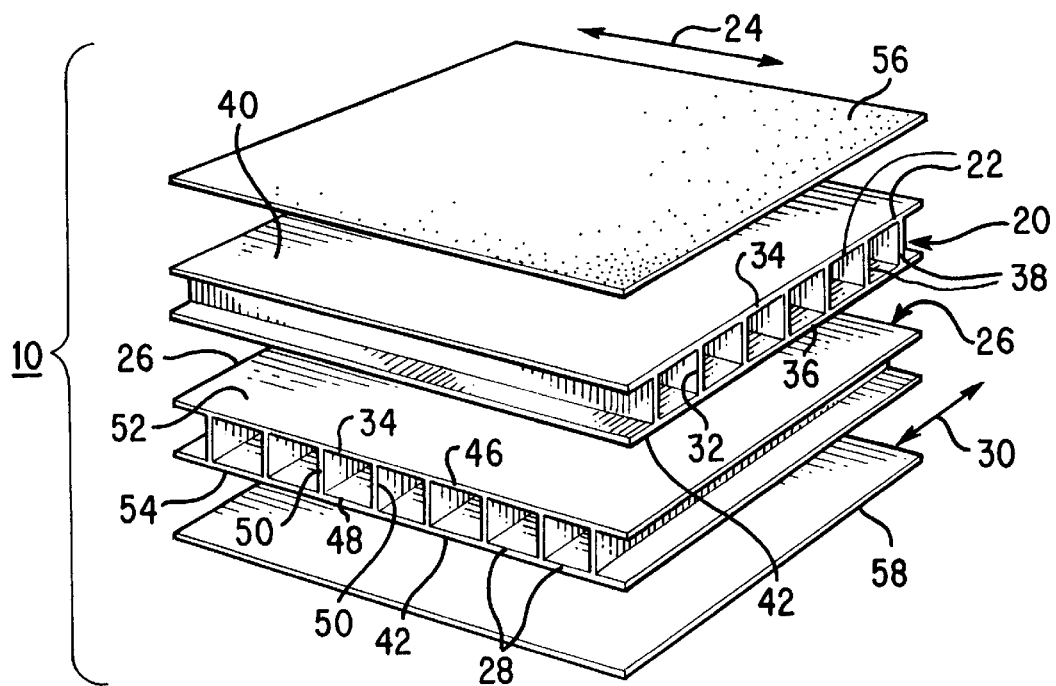
FIG. 4 is an exploded view of a composite panel showing first and second cores in association with outer skin members; and, FIG. 5 is a schematic view of a roller coater and press employed to apply and press adhesive and then to laminate materials together to provide a composite panel structure.

As is more clearly seen in FIGS. 2, 3, and 4, composite panel 10 includes first core 20 formed of a plurality of first cell members 22 which are contiguously located each to the other defining first core through passages 32 which extend in longitudinal direction 24 as is seen in FIGS. 3 and 4. First core 20 is defined by the plurality of first cell members 22 located or positioned adjacent each to the other in contiguous manner to provide a lightweight, and deflectable overall element which would absorb impact loading. Each of first cell members 22 includes opposing first cell member top and bottom members 34 and 36, as is seen in FIG. 4, and further includes opposing first cell member side members 38 with each of the side members 38 forming a side member of a next consecutively spaced first cell member 22, as is seen in FIGS. 2–4.

In general, first core 20 may be formed in a one-piece formation defining an overall first core top member 40 and a first core bottom member 42. First core 20 may be formed of a plastic composition and in particular may be formed of a closed cell plastic composition such as polypropylene. In this manner, first core 20 may be molded in one-piece formation to provide a unitarily formed first core 20. As can be seen in FIGS. 2–4, first core through passages 32 in cross-section may be formed in a rectangular contour and extend in longitudinal direction 24. In this manner, first core 20 allows for added flexure about transverse direction 30 while maintaining a relatively stiff structural resistance about longitudinal direction 24.

Referring now to FIG. 2, it is seen that second core 26 is formed in substantially the same manner being formed of second cell members 28 contiguously mounted each to the other defining respective second core through passages 44 extending in transverse direction 30. Each of second cell members 28 is formed of a second cell top member 46, a second cell bottom member 48, and a pair of second cell opposing side members 50, as is seen. Each of second cell members 28 are formed adjacent and contiguous each next to the other forming a second core top member 52 and a second core bottom member 54. As was the case with first core 20, second core 26 may be formed of plastic composition and specifically polypropylene or other closed cell type plastic composition. Second core through passages 44 extend in transverse direction 30 and provide for relatively stiff structural integrity about transverse direction 30 while allowing a deflection about longitudinal direction 24. Second core 26 may be formed through molding or some like technique to provide a unitary body.

The orientation of first core 20 and second core 26 is of importance and as is seen in the Figures, the core members 20 and 26 are oriented orthogonal each to the other when taken with respect to longitudinal direction 24 and transverse direction 30. As can be seen, an axis line of second core through passages 44 extends in a direction which is orthogonal or perpendicular to an axis line of first core through passages 32 when composite panel 10 is formed into an overall composite structure.

In the overall construction of composite panel 10, there is a mechanism for securing first core 20 to second core 26 to provide an overall laminated composite panel 10. The mechanism for securing first core 20 to second core 26 may be through adhesion using an adhesive composition between first and second core members 20 and 26. The particular adhesive composition or glue is not important to the inventive concept as herein defined, with the exception that first core 20 and second core 26 be maintained in secured relation each to the other. The adhesive composition may be a urethane complex or some like adhesive composition. One particular adhesive composition used effectively in securing first core 20 to second core 26 is a glue composition manufactured by Morton International having a designation MOR-AD858-3.

The overall thickness of each of cores 20 and 26 approximate $7/16^{ths}$ of an inch with interior side members 38 and 50 being displaced each from the other approximately by a dimension of $7/16^{ths}$ of an inch. Through the use of closed cell polypropylene, the weight of the combined first and second cores 20 and 26 approximates 0.41 lbs. per square foot.

Composite panel 10 may include a first core skin 56 secured to first core top member 40 and may be formed of a fiberglass reinforced plastic which may be used in combination with laminated first and second cores 20 and 26 to form a laminated composite panel 10 having a single core skin 56.

In a preferred embodiment of panel 10, first and second cores 20 and 26 include respective first core skin 56 and second core skin 58 mounted in contiguous relation to first core top member 40 and second core bottom member 54, as is seen in FIG. 4. First core skin 56 may be formed of a fiberglass reinforced plastic having a thickness approximating 0.5 inches or greater. Such fiberglass reinforced plastic type sheeting is commercially available and provides for structural integrity of the overall composite panel 10 while maintaining a deflection sufficient to absorb impact loading.

Second core 26 may include a second core skin 58 formed of aluminum which may include a crystal coating to provide weatherability with respect to the external environment. Second core skin 58 may be formed of aluminum having a thickness approximating 0.03 inches or greater with a crystal coating to enhance weatherability. Obviously, aesthetic considerations may be taken into account and such may be stucco embossed or other designs may be formed thereon. In some cases, only first core skin 56 or second core skin 58 may be employed in the construction of composite panel 10. Alternatively, it may be desirable in some cases to only use an aluminum skin and in other cases, the fiberglass reinforced plastic skin.

Figure 5:
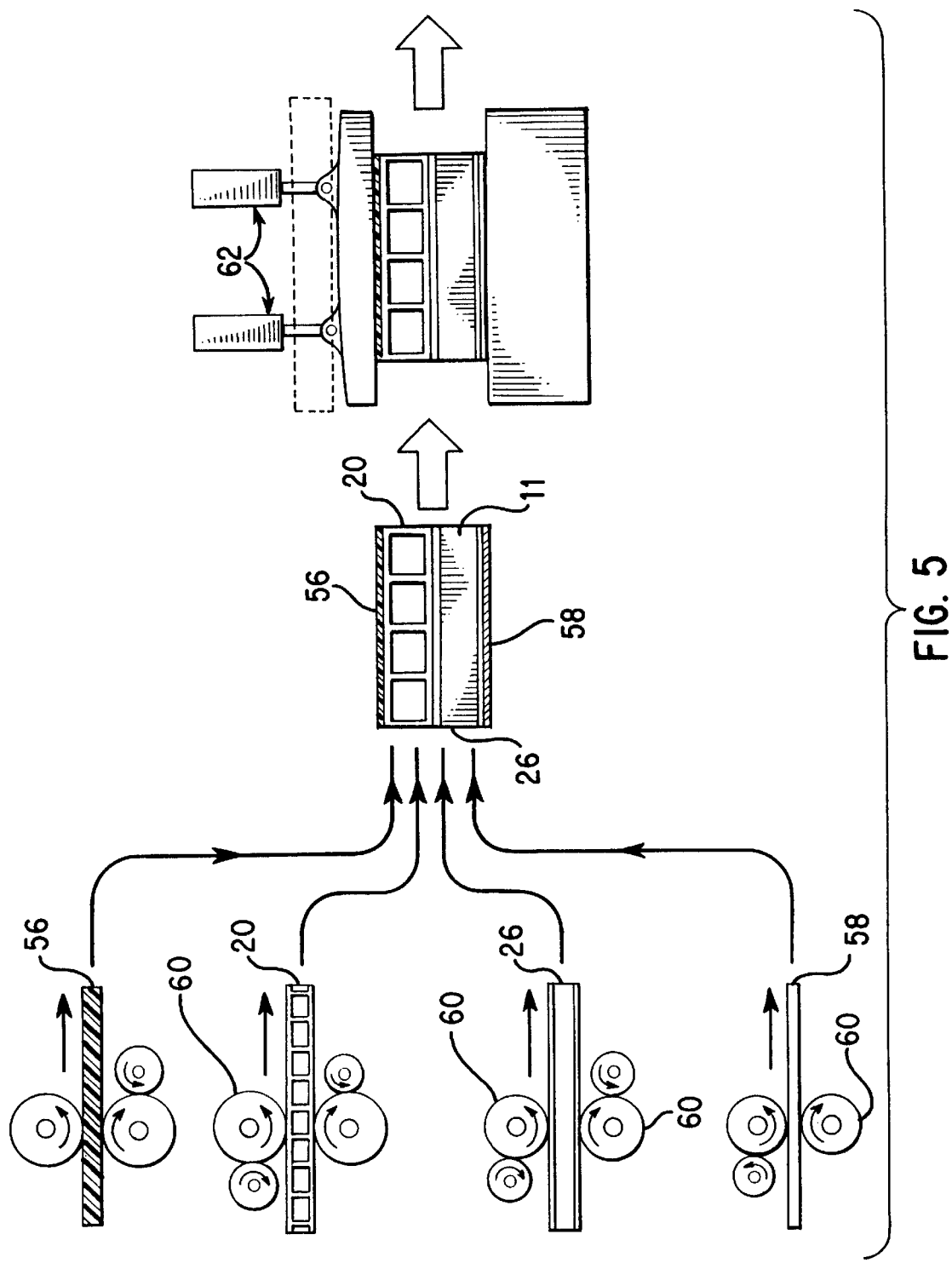

In the method of forming composite panel 10, and in particular relation to FIG. 5, first and second cores 20 and 26 having respective through passages 32 and 44 are initially cut to a predetermined size. Cores 20 and 26 are machine spreaded with polyurethane adhesive to a thickness approximating 0.006–0.008 inches on one side of cores 20 and 26, as is seen in FIG. 5 by a commercially available roll coater 60. First and second cores 20 and 26 are oriented in a manner such that first core through passages 32 extend in a direction which is orthogonal with respect to second core through passages 44.

Cores 20 and 26 are then placed in pneumatic press 62 for curing. Such presses are commercially available, and one such press which has been used is manufactured by Black Brothers having a Model Number ACR POD PRESS. Curing takes approximately 4–8 hours dependent upon material temperature with pneumatic press 62 exerting a pressure approximating 8.0 lbs. per square inch. Temperature considerations during the curing process are maintained at ambient temperature generally between 60° F.–80° F.

In this manner, first and second cores 20 and 26 have been laminated into a one-piece structure. Once the cross-lamination of cores 20 and 26 has been completed, the structure now defined by the secured cores 20 and 26 is removed from pneumatic press 62 and once again run through adhesive spreader or roll coater 60 to allow a spreading of adhesive between 0.006–0.008 inches on each side. First core skin 56 and second core skin 58 are mounted on the cores and the skins are run through the rubbery press to distribute the adhesive. Finally, the overall structure including first core skin 56, first core 20, second core 26, and second core skin 58 are mounted in pneumatic press 62 for further curing to provide overall composite panel 10.

Although this invention has been described in connection with specific forms and embodiment thereof, it will be appreciated that various modifications other than those discussed above may be resorted to without departing from the spirit or scope of the invention. For example, functionally equivalent element may be substituted for those specifically shown and described, proportional quantities of the elements shown and described may be varied, and in the formation method steps described, particular steps may be reversed or interposed, all without departing from the spirit or scope of the invention as defined in the appended Claims.

What is claimed is:

1. A composite panel mounted to a base surface for absorbing impact loading comprising:
   (a) a first core formed of a plurality of first cell members contiguously mounted each to the other defining respective first core through passages extending in a longitudinal direction;
   (b) a second core formed of a plurality of second cell members contiguously mounted each to the other defining respective second core through passages extending in a transverse direction with respect to said longitudinal direction; and,
   (c) means for securing said first core to said second core for providing a laminated composite panel,
       each of said first and second cell members including a pair of top and bottom members and a pair of opposing side members forming a continuous substantially rectangular contour in cross-section of said first and second cores through passages, each said side member constituting a single integral side member separating adjacent through passages.

2. The composite panel as recited in claim 1 where said first core is formed in one-piece formation defining a first core top member and a first core bottom member.

3. The composite panel as recited in claim 2 where said first core is molded.

4. The composite panels as recited in claim 2 where said first core is formed of a plastic composition.

5. The composite panel as recited in claim 1 where said means for securing said first core to said second core includes an adhesive composition sandwiched between said first and second core members.

6. The composite panel as recited in claim 5 where said adhesive composition is formed of a urethane complex.

7. The composite panel as recited in claim 1 including a first skin member secured to a first core top member.

8. The composite panel as recited in claim 7 where said first skin member is formed of a fiberglass reinforced plastic sheet, said fiberglass reinforced plastic sheet having a thickness equal to or greater than 0.50 of an inch.

9. The composite panel as recited in claim 7 where said first skin member is formed of an aluminum sheet having a thickness greater than 0.03 of an inch.

10. The composite panel as recited in claim 1 where said second core member is formed in one-piece formation defining a second core top member and a second core bottom member.

11. The composite panel as recited in claim 10 where said second core is molded.

12. The composite panel as recited in claim 11 where said second core is formed of a plastic composition.

13. The composite panel as recited in claim 1 including a second skin member secured to a second core bottom member.

14. The composite panel as recited in claim 13 where said second skin member is formed of a fiberglass reinforced plastic sheet, said fiberglass reinforced plastic sheet having a thickness equal to or greater than 0.50 of an inch.

15. The composite panel as recited in claim 13 where said second skin member is formed of an aluminum sheet having a thickness greater than 0.03 of an inch.

16. A method of forming a composite panel including the steps of:
   (a) establishing a first core formed of a plastic sheet material defining a plurality of first cell members secured each to the other through an integral side member, thereby defining first core through passages;
   (b) establishing a second core formed of a plastic sheet material defining a plurality of second cell members secured each to the other through an integral side member, thereby defining second core through passages, said first and second through passages being of substantially rectangular shape in cross-section thereof;
   (c) orienting said first and second cores whereby said first core through passages extend in an orthogonal direction with respect to said second core through passages; and,
   (d) adhesively laminating said first core to said second core.

17. The method as recited in claim 16 including the step of laminating a first skin member to a first core top member.

18. The method as recited in claim 17 including the step of laminating a second skin member to a second core bottom member.

* * * * *